United States Patent [19]
Hennig et al.

[11] Patent Number: 5,084,535
[45] Date of Patent: Jan. 28, 1992

[54] PREPARATION OF PULVERULENT POLYMERS OF ACRYLIC AND/OR METHACRYLIC ACID AND USE THEREOF

[75] Inventors: Karl Hennig, Hessheim; Heinrich Hartmann, Limburgerhof; Hans-Juergen Raubenheimer, Ketsch; Hermann Fischer, Limburgerhof; Walter Denzinger, Speyer, all of Fed. Rep. of Germany

[73] Assignee: BASF Aktiengesellschaft, Ludwigshafen, Fed. Rep. of Germany

[21] Appl. No.: 438,035

[22] Filed: Nov. 20, 1989

[30] Foreign Application Priority Data

Dec. 15, 1988 [DE] Fed. Rep. of Germany ....... 3842185

[51] Int. Cl.$^5$ ................................................ C08F 2/38
[52] U.S. Cl. .................................... 526/211; 526/212; 526/216; 526/287; 526/214
[58] Field of Search ............... 526/216, 224, 214, 211, 526/212, 287

[56] References Cited

U.S. PATENT DOCUMENTS

| | | | |
|---|---|---|---|
| 3,898,037 | 8/1975 | Lange et al. ........................ | 252/395 |
| 3,941,724 | 3/1976 | Bolto ................................... | 526/216 |
| 4,135,043 | 1/1979 | Kast et al. ............................ | 526/63 |
| 4,301,266 | 11/1981 | Muenster et al. .................. | 526/212 |
| 4,698,404 | 10/1987 | Cramm et al. ..................... | 526/216 |

FOREIGN PATENT DOCUMENTS

| | | |
|---|---|---|
| 1194648 | 10/1985 | Canada . |
| 0113048 | 7/1984 | European Pat. Off. . |
| 2058801 | 4/1981 | United Kingdom . |

Primary Examiner—Joseph L. Schofer
Assistant Examiner—N. Sarafim
Attorney, Agent, or Firm—Oblon, Spivak, McClelland, Maier & Neustadt

[57] ABSTRACT

Pulverulent polymers of acrylic acid and methacrylic acid are prepared by polymerizing (a) from 100 to 70% by weight of acrylic acid, methacrylic acid or a mixture thereof and (b) from 0 to 30% by weight of vinylsulfonic acid or an alkali metal salt thereof in a monohydric $C_1$-$C_8$-alcohol, water or a mixture thereof in a pulverulent bed in the presence of a polymerization initiator and from 0.05 to 10 mol % of thiocarboxylic acid and/or a mercaptoalcohol and from 0.05 to 10 mol % of propionic acid or formic acid as regulators, each percentage being based on the monomers used in the polymerization, by maintaining the pulverulent state during the polymerization, removing the heat of polymerization by distilling off the solvent and recirculating the reaction mixture.

9 Claims, No Drawings

PREPARATION OF PULVERULENT POLYMERS OF ACRYLIC AND/OR METHACRYLIC ACID AND USE THEREOF

U.S. Pat. No. 4,135,043 discloses a process for preparing pulverulent water-soluble polymers by polymerizing water-soluble ethylenically unsaturated monomers in a pulverulent bed in the presence of customary polymerization initiators and water as auxiliary liquid by maintaining the pulverulent state, removing the heat of polymerization by distilling off water, and recirculating the reaction mixture.

CA Patent 1,194,648 likewise discloses a process for preparing pulverulent polymers by polymerizing the monomers in a pulverulent bed, wherein the heat of polymerization is removed by using inert organic solvents which are a coagulant for the polymers. The existing processes give polymers having a relatively high molecular weight and a broad molecular weight distribution.

U.S. Pat. No. 3,898,037 discloses copolymers of (meth)acrylamidoalkylsulfonic acids and acrylic acid or methacrylic acid, which are used in small amounts (up to about 100 ppm) as corrosion inhibitors. The copolymers can be prepared by copolymerizing the monomer mixtures in solvent mixtures of water and isopropanol.

U.S. Pat. No. 4,301,266 discloses a process for preparing polymers of acrylic acid or methacrylic acid, or mixtures thereof, by polymerizing the monomers in isopropanol or mixtures of water and isopropanol of not less than 40% by weight isopropanol with the aid of free radical polymerization initiators at from 120° to 200° C. under superatmospheric pressure. The polymers are used as dispersants for preparing aqueous pigment slurries for paper coating compositions. However, there is also a demand for pulverulent dispersants and grinding aids. Pulverulent products, however, cannot be prepared in an economical manner from polymer solutions obtained by existing processes.

EP Patent 0,113,048 discloses a process for preparing pulverulent polymers based on water-soluble ethylenically unsaturated monomers by polymerizing monomers which contain acid groups and are dissolved in water or water/isopropanol mixtures in a pulverulent bed in the presence of customary polymerization initiators by maintaining the pulverulent state, removing the heat of polymerization by distilling off the solvent, and recirculating the reaction mixture, 40-95% of the acid groups of the monomers being neutralized and the polymerization being carried out in the presence of from 0.05 to 10 mol %, based on the monomers, of a thiocarboxylic acid or 2-mercaptoethanol as regulator. The homopolymers and copolymers thus obtained are used as grinding aids and dispersants for pigments and as encrustation and grayness inhibitors for detergents.

It is an object of the present invention to provide a process for preparing pulverulent polymers of acrylic or methacrylic acid which have a lower molecular weight and narrower molecular weight distribution than those polymers which are obtainable by the existing processes for preparing pulverulent products We have found that this object is achieved according to the invention by a process for preparing a pulverulent polymer of acrylic and/or methacrylic acid by polymerizing (a) from 100 to 70% by weight of acrylic acid, methacrylic acid or a mixture thereof and (b) from 0 to 30% by weight of a compound of the formula $CH_2=CH-SO_3Me$, where Me is H, Na, K or $NH_4$, in a monohydric $C_1-C_8$-alcohol, water or a mixture thereof in a pulverulent bed in the presence of a polymerization initiator and a regulator by maintaining the pulverulent state during the polymerization, removing the heat of polymerization by distilling off the solvent and recirculating the reaction mixture by using as the regulator from 0.5 to 10 mol % of a thiocarboxylic acid or of a mercaptoalcohol and from 0.05 to 10 mol % of propionic acid or formic acid, each percentage being based on the monomers used in the polymerization.

The combination of a thiocarboxylic acid or a mercaptoalcohol with propionic acid or formic acid produces a synergistic effect as polymerization regulator. Neither propionic acid or formic acid alone nor a strong regulator such as a thiocarboxylic acid or a mercaptoalcohol alone makes it possible to obtain polymers of acrylic or methacrylic acid having such low molecular weights as produced by the combination of a thiocarboxylic acid or a mercaptoalcohol with propionic acid, formic acid or a mixture thereof. The use of a regulator mixture in the polymerization also leads to a polymer of acrylic or methacrylic acid which, compared with conventionally obtained polymers, have a narrower molecular weight distribution and a lighter color.

The process according to the present invention gives low molecular weight homopolymers or copolymers of acrylic and/or methacrylic acid. To prepare homopolymers, either acrylic acid or methacrylic acid are polymerized. However, acrylic acid and methacrylic acid can also be copolymerized with each other in any desired ratio. Acrylic acid and methacrylic acid can also be copolymerized with the monomers of group (b). The monomers of group (b) are vinylsulfonic acid and the alkali metal or ammonium salts thereof. Of the salts, preference is given to the sodium, potassium and ammonium salts.

The polymerization is carried out as in the processes described at the beginning in a pulverulent bed. First a solution of the monomer(s) is prepared in a monohydric $C_1-C_8$-alcohol, in water or in a mixture of a monohydric $C_1-C_8$-alcohol and water. Solvents of this kind are for example methanol, ethanol, isopropanol, n-propanol, n-butanol, isobutanol, tert-butanol, n-hexanol and cyclohexanol, and also mixtures thereof. These mixtures may additionally contain water, or the individual alcohols are used mixed with water, as for example in the form of mixtures of methanol and water or isopropanol and water. The concentration of monomer in the solvent is 30-70% by weight. To start the polymerization in a pulverulent bed, it is necessary for a powder to be present. In principle, it is possible to use any desired inert pulverulent material for this purpose, but preferably the powder is a pulverulent polymer of the same composition as the polymer which is to be prepared. It may have been prepared by any other, existing process, for example by solution polymerization of acrylic acid in isopropanol and removal of the solvent at the end of polymerization. The pulverulent polymer introduced into the reactor before the start of the polymerization has a particle diameter of from 0.1 to 3 mm.

The polymerization is carried out in the presence of a customary polymerization initiator. Preference is given to using a polymerization initiator which is soluble or emulsifiable in water, for example hydrogen peroxide, sodium peroxodisulfate, potassium peroxodisulfate or ammonium peroxodisulfate. Other suitable initiators are the known redox catalyst systems such as metal salts and peroxides, water-soluble azo compounds, such as 2,2'-azobis(2-amidinopropane) hydrochloride, and ketone peroxides, eg. acetylacetone peroxide. Based on the amount of monomer used in the polymerization, from 1 to 20, preferably from 4 to 10,% by weight of an initiator is used. Preferably, the polymerization is carried out in the presence of hydrogen peroxide or a water-soluble azo compound as free radical polymerization initiator.

According to the invention, the polymerization is carried out in the presence of a regulator mixture. The regulator mixture comprises a strong regulator, for example a thiocarboxylic acid, mercaptoalcohol or a mixture of a thiocarboxylic acid and a mercaptoalcohol, combined with a weak polymerization regulator selected from the group consisting of propionic acid, formic acid and mixtures of propionic acid and formic acid. Surprisingly, the combination of the regulators mentioned reduces the molecular weight of polymers of acrylic and/or methacrylic acid to an extent not attainable for example by increasing the amount of the strong polymerization regulator, eg. thioglycolic acid or 2-mercaptoethanol, alone. Suitable thiocarboxylic acids are for example thioglycolic acid, thiolactic acid, 3-mercaptopropionic acid, 2-mercaptopropionic acid, 2-mercaptobutyric acid, 3-mercaptobutyric acid and 3-mercaptosuccinic acid. In general, a suitable thiocarboxylic acid has from 2 to 5 carbon atoms. Suitable mercaptoalcohols have from 2 to 4 carbon atoms, eg. 2-mercaptoethanol, 3-mercaptopropanol, 2-mercaptopropanol, mercaptobutanols and 3-mercapto-1,2-propanediol.

Based on the monomers used in the polymerization, from 0.05 to 10 mol % of a thiocarboxylic acid and/or of a mercaptoalcohol and from 0.05 to 10 mol % of propionic acid and/or formic acid are used. The ratio of strong regulator:weak regulator is preferably 2:1.

The polymerization of the monomers can be carried out over a wide temperature range. An essential feature of the present polymerization is that the pulverulent state is maintained during the polymerization; that is, the temperature in the polymerization vessel should be not less than 10° C. below the melting point, or softening point, of the polymer to prevent the individual polymer particles from sticking together. However, the temperature must be sufficiently high that the particular solvent or solvent mixture used will evaporate from the polymerization zone. The polymerization can be carried out under atmospheric pressure, under reduced pressure or even under superatmospheric pressure, for example at up to 25 bar. Preferably, the polymerization is carried out under atmospheric pressure within the temperature range from 115° to 180° C., preferably from 120° to 150° C. It can take place batchwise or continuously. In either case, the vessel used for the reaction zone can be a stirred kettle or a dynamic mixer of some kind. In the case of continuous operation, the monomer solution is fed continuously or periodically into the reaction zone, and the polymer is likewise removed continuously or periodically from the reaction zone with the aid of a suitable discharge mechanism, for example a screw. The rate at which polymer is removed per unit time is approximately the same as the rate at which monomer is introduced into the reaction zone. Suitable polymerization reactors are for example kettles, stirred autoclaves, combinations of stirred kettles with a downstream flow pipe, and cascades of stirred kettles or autoclaves.

To carry out the polymerization, the partially or completely neutralized monomer solution or emulsion is introduced in finely divided form onto the previously introduced powder in the polymerization zone, or is sprayed directly into the pulverulent bed. This step is in general done by spraying the monomer solution through one or more nozzles. A particularly fine division of the monomer solution is obtained by means of a multimaterial nozzle, for example a two- or three-material nozzle, on introducing an inert gas stream through the nozzle orifice, so that the monomer solution conveyed through the other nozzle orifice of a two-material nozzle is finely divided by the stream of inert gas, for example nitrogen. To introduce the monomer into the reaction zone, either the nozzle dips into the pulverulent bed or the monomers are sprayed onto the pulverulent bed. Adequate recirculation of the reaction mixture must be ensured during the polymerization. Preferably, this recirculation is accomplished by stirring the mixture. The heat formed in the course of the polymerization of the monomers and the heat from the recirculation of the powder are removed from the reaction zone by continuous evaporation of the solvent or solvent mixture. In a preferred embodiment of the process according to the present invention, the acid groups of the monomers are neutralized to an extent of from 40 to 95% with an alkali metal base or ammonia during the polymerization. In this case it is of course necessary also to remove the heat of neutralization from the polymerizing system. To this end, the concentration of monomer in the solvent is chosen in such a way that the liberated heat is just sufficient to remove all the solvent from the polymerization zone under the prevalent reaction conditions by evaporation, so that the pulverulent state is maintained throughout the polymerization. The concentration of monomer in the solvent is therefore preferably within the range from 45 to 60% by weight.

The homopolymers or copolymers of acrylic and/or methacrylic acid obtainable by the process according to the present invention have K values of from 20 to 40 (determined by the method of H. Fikentscher in water at a polymer concentration of 1% by weight at 25° C. and pH 7.0 on the sodium salt). The polymers are used as grinding aids and/or dispersants for preparing aqueous slurries of pigments for paper coating compositions. The amount of copolymer used is from 0.05 to 1.0, preferably from 0.3 to 0.6.% by weight, based on pigment. The suitable pigments for preparing paper coating compositions are for example chalk, clay, satin white, titanium dioxide, kaolin and dolomite. These pigments are used to prepare highly concentrated aqueous slurries which, depending on the nature of the pigment and its particle size, can in some instances have solids contents of up to 90% by weight. The solids contents of clay slurries range from 65 to 70% by weight, while in the case of chalk the solids content of the aqueous slurries is from 5 to 85% by weight, sometimes even up to 90% by weight. The aqueous pigment slurries are preferably prepared by adding the dispersant to the pigment even in the course of grinding. This grinding process is, as will be known, carried out in aqueous medium. Grinding or dispersing requires in general from 0.1 to 0.6% by weight of homopolymer or copolymer of acrylic acid and/or methacrylic acid.

A further field of application for the homopolymers and copolymers obtainable by the process according to the present invention is the use in detergents, where they are used as incrustation inhibitors. The amounts used for this purpose range from 0.5 to 10% by weight, based on the detergent composition. The percentages in the examples are % by weight. The K values were determined by the method of H. Fikentscher, Cellulose Chemie 13 (1932), 48-64, 71-74, in 1% strength by weight aqueous solution at 25° C. and pH 7.0 on the sodium salt of the polymer; here $K = k \cdot 10^3$.

The heterogeneity of the polymers was determined by measuring the number average ($M_n$) and the weight average ($M_w$) by gel permeation chromatography.

The Examples and Comparative Examples below were carried out in a 40 l capacity polymerization kettle equipped with a helical stirrer, a descending condenser, addition means and for working under nitrogen. The reactor was continuously fed through an addition line with a mixture of monomer solution, initiator and polymerization regulator. An aqueous alkaline metal hydroxide solution was fed into the reactor through another addition line. The pressure in the polymerization reactor was kept constant by a pressure valve fitted to the far end of the descending condenser. The apparatus was heated by means of a steam heated pressurized water cycle. A separator was fitted between the polymerization reactor and the descending condenser in order to hold back any solids entrained in the stream of nitrogen or by the vapor of the escaping boiling aid. To permit monitoring of the reaction temperature the reactor was equipped with a temperature probe immersed in the pulverulent material.

To enable the polymer formed to be discharged, the polymerization kettle was equipped on the side in its top third with a discharge screw which, once a certain amount of pulverulent polymer was present in the kettle, discharged granular material into a downstream collecting vessel. The amount of polymer in the reaction kettle is kept constant by a continuous procedure. The collecting vessel can be disconnected periodically from the polymerization kettle by means of two shutoff elements, depressurized and emptied. The above-described apparatus was each time charged with 20 kg of a granulated powder prepared by spray drying a solution polymer of acrylic acid, particle diameter 2-3 mm, and the initial charge was heated with intensive recirculation to the particular reaction temperature indicated for each of the following Examples. This solution polymer had in each case the target composition of polymer to be prepared.

EXAMPLE 1

In a static mixer, 5200 g of acrylic acid, 800 g of water, 270 g of 2-mercaptoethanol, 52 g of propionic acid and 960 g of 50% strength hydrogen peroxide were continuously mixed per hour, and the mixture being formed was continously sprayed through a one-material nozzle onto a moving bed of granular polysodium acrylate previously prepared from a solution polymer by spray drying and granulation. At the same time, aqueous sodium hydroxide solution is continuously sprayed at a rate of 2500 g of sodium hydroxide and 2500 g of water per hour elsewhere onto the moving bed of solids. The polymerization temperature was 140° C. A pressure of 1.70 bar was established in the reactor by pressurizing with nitrogen. During the polymerization the pulverulent state of the reaction mixture was maintained, and the added water was continuously distilled off together with the water liberated in the course of neutralization. The amount of condensate was 4500 g of water per hour.

Polymer was discharged at a rate of 7000 g per hour from the polymerization kettle through the discharge screw into the collecting vessel, where it was maintained at 140° C. and the same pressure of 1.70 bar for an hour. The vessel was then slowly depressurized, and the granular material was discharged. Following a polymerization time of about 36 hours, corresponding to about 15 batchwise kettle throughputs, the discharged polymer was analyzed. It was found to have a K value of 37.7 and a gel content of less than 1%. The polymer had a heterogeneity ratio $M_w/M_n$ of 12.8 and a light color.

COMPARATIVE EXAMPLE 1

Example 1 was repeated, except that the polymerization was carried out in the absence of propionic acid. The result obtained on this occasion was a polyacrylic acid having a K value of 40.2 and a residual monomer content and a gel content each of less than 1%. The molecular heterogeneity $M_w/M_n$ was 15.6.

EXAMPLE 2

Example 1 was repeated, except that the amount of propionic acid was raised to 130 g per hour. This produced a polymer having a gel content of below 1% and a K value of 36.1. The polymer had a heterogeneity value $M_w/M_n$ of 12.2 and a light color.

EXAMPLE 3

Example 1 was repeated, except that the reactor was supplied with 260 g of propionic acid per hour. The result obtained was a polymer having a gel content of less than 1% and a K value of 35.0. It also had a heterogeneity value $M_w/M_n$ of 10.5 and a light color.

EXAMPLE 4

Example 1 was repeated, except that the polymerization reactor was supplied with 520 g of propionic acid per hour. The result obtained was a polymer having a gel content of less than 1%, a K value of 34.5, a heterogeneity value $M_w/M_n$ of 10.7 and a light color.

COMPARATIVE EXAMPLE 2

The apparatus described in Example 1 was charged via a static mixer with a continuous stream of 5200 g of acrylic acid, 800 g of water, 388 g of 2-mercaptoethanol and 960 g of 50% strength hydrogen peroxide per hour. At the same time, aqueous sodium hydroxide solution was continuously sprayed at a rate of 2500 g of sodium hydroxide and 2500 g of water per hour elsewhere onto the moving bed of solids. The polyacrylic acid obtained was neutralized to 85% and had a gel content of less than 1%, a K value of 40.1, a heterogeneity ratio $M_w/M_n$ of 15.4 and a weakly yellow color compared with the polymers prepared as described in Examples 1 to 4.

COMPARATIVE EXAMPLE 3

Comparative Example 2 was repeated except that the amount of 2-mercaptoethanol was raised to 394 g per hour, corresponding to 7 mol % based on the acrylic acid used. The result obtained was a polyacrylic acid having a gel content of less than 1%, a K value of 39.9, a heterogeneity ratio $M_w/M_n$ of 15.4 and an even yellower color than that prepared in Comparative Example 2. The increased amount of mercaptoethanol also gave the polymer a pungent odor.

COMPARATIVE EXAMPLE 4

Comparative Example 1 was repeated, except that the polymerization reactor was fed with 156 g of acetic acid per hour as well as the monomers. The result obtained was a polyacrylic acid having a gel content of less than 1%, a K value of 39.5, a heterogeneity ratio $M_w/M_n$ of 16.0 and a pale yellow color.

COMPARATIVE EXAMPLE 5

Comparative Example 4 was repeated, except that the amount of acetic acid was increased to 260 g per hour. The result obtained was a polyacrylic acid having a gel content of less than 1%, a K value of 39.9, a heterogeneity ratio $M_w/M_n$ of 15.1 and a pale yellow color.

EXAMPLE 5

Example 1 was repeated, except that the propionic acid was replaced by 130 g of formic acid per hour. The result obtained was a polymer having a gel content of less than 1%, a K value of 36.4, a heterogeneity ratio $M_w/M_n$ of 11.8 and a light color.

EXAMPLE 6

Example 5 was repeated, except that the amount of formic acid was raised to 260 g per hour. The result obtained was a polyacrylic acid having a gel content of less than 1%, a K value of 34.8, a heterogeneity ratio $M_w/M_n$ of 9.5 and a light color.

EXAMPLE 7

Example 1 was repeated, except that, in a departure from the directions given there, the polymerization reactor was charged via a static mixer with a monomer stream of 4900 g of acrylic acid, 130 g of propionic acid, 281 g of thioglycolic acid, 1100 g of a 25% strength aqueous solution of sodium vinylsulfonate and 360 g of a 50% strength solution of hydrogen peroxide in water per hour. At the same time, an aqueous solution of 2080 g of sodium hydroxide in 2080 g of water is continuously sprayed onto the surface of the stirred pulverulent bed from the other feed point. The other measures conform to those indicated in Example 1. The result obtained in this way was a copolymer of acrylic acid and vinylsulfonate in the form of the sodium salt with a gel content of less than 1% and a K value of 36.0. The copolymer had a heterogeneity ratio $M_w/M_n$ of 11.7 and a light color.

We claim:
1. A process for preparing a pulverulent polymer of acrylic or methacrylic acid by polymerization in a pulverulent bed, which comprises polymerizing
   (a) from 100 to 70% by weight of acrylic acid, methacrylic acid or a mixture thereof, and
   (b) from 0 to 30% by weight of a compound of the formula $CH_2=CH-SO_3Me$, where Me is H, Na, K or $NH_4$, in a monohydric $C_1-C_8$-alcohol, water or a mixture thereof in a pulverulent bed in the presence of a polymerization initiator and a regulator comprising
   i) from 0.5 to 10 mol % of a thiocarboxylic acid, of a mercaptoalcohol or a mixture thereof, and
   ii) from 0.05 to 10 mol % of propionic acid, formic acid or a mixture thereof,
each percentage being based on the monomers used in the polymerization, by maintaining the pulverulent state during the polymerization, removing the heat of polymerization by distilling off the solvent and recirculating the reaction mixture.

2. The process as claimed in claim 1, wherein the acid groups of the monomers are neutralized to an extent of from 40 to 95% with an alkali metal base or ammonia during the polymerization.

3. The process as claimed in claim 1, wherein the regulator is thioglycolic acid or 2-mercaptoethanol and propionic acid.

4. The process as claimed in claim 1, wherein said $C_1-C_8$-alcohol is methanol, ethanol, isopropanol, n-propanol, n-butanol, isobutanol, t-butanol, n-hexanol or cyclohexanol.

5. The process as claimed in claim 1, wherein the pulverulent polymer of said pulverulent bed has a particle size diameter ranging from 0.1 to 3 mm.

6. The process as claimed in claim 1, wherein said thiocarboxylic acid is thioglycolic acid, thiolactic acid, 3-mercaptopropionic acid, 2-mercaptopropionic acid, 2-mercaptobutyric acid, 3-mercaptobutyric acid or 3-mercaptosuccinic acid.

7. The process as claimed in claim 1, wherein said mercapto alcohol is 2-mercaptoethanol, 3-mercaptopropanol, 2-mercaptopropanol, mercaptobutanol or 3-mercapto-1,2-propanediol.

8. The process as claimed in claim 1, wherein the ratio of regulator (i) to regulator (ii) is 2:1.

9. The process as claimed in claim 1, wherein the temperature range over which polymerization occurs is 115° to 180° C.

* * * * *